United States Patent Office 2,710,809
Patented June 14, 1955

2,710,809
SELF-ICING CAKE PRODUCT AND PROCESS OF MAKING THE SAME

John S. Andrews, St. Paul, and Thomas R. Freer, Minneapolis, Minn., assignors to General Mills, Inc., a corporation of Delaware No Drawing. Application July 2, 1953,
Serial No. 365,765

13 Claims. (Cl. 99—92)

The present invention relates to a self-icing cake composition and more particularly to a cake mix including icing ingredients which permits the preparation of a cake batter containing the cake ingredients and the icing ingredients in such a form that the product when baked will have a separate and distinct icing layer. The icing ingredients are in the form of candy particles which settle to the bottom of the baking container and fuse at baking temperatures to provide an icing layer at the bottom of the baking container. Upon inversion of the baking container a self-iced cake is obtained.

It is, therefore, an object of the present invention to provide a novel cake composition containing cake ingredients and icing ingredients such that upon baking, the product obtained is an iced cake.

It is a further object of the present invention to provide a novel process of preparing a cake in which the cake is baked and iced in a single operation.

The objects of the invention are achieved by poviding a cake batter containing the usual cake ingredients, and in addition containing hardened sugar or candy particles having certain physical properties. The actual composition of the candy particles is not critical and may be varied widely. The candy particles, however, should possess certain physical characteristics which will depend upon the particular form in which the invention is practiced, as will be pointed out more fully below.

The preferred form of the invention is in the form of a dry baking mix which contains the cake components and the icing components in a single product. Thus, it is possible to prepare a dry cake mix containing the usual ingredients, flour, sugar, shortening, salt, leavening and flavoring materials and to distribute thoroughly through this cake mix the candy product in the desired quantity such that the entire contents of the package may be made into a batter and baked into a cake. This form of the invention is particularly advantageous in that it simplifies packaging problems. Thus a uniform dry mix is obtained which can be packaged in ordinary equipment and in ordinary packages. The candy particles become coated with flour and other dry materials and present no problem of sticking together. The user simply places the contents of the package in a mixing bowl, adds the required amount of liquid and mixes the batter.

Where a dry cake mix is provided containing the candy particles distributed therethrough, it is also possible for the user to subject the cake mix to a coarse screening operation for the separation of the candy particles, and these separated candy particles may then be placed in the bottom of the baking container without necessarily being mixed in the batter. This presents the advantage of permitting the candy particles to be coated with the flour during transport and avoids the difficulty of the candy particles sticking together. At the same time it permits the candy particles to be placed in the bottom of the baking container and does not require the migration of the candy particles through the batter to the bottom of the baking container.

Other forms of the invention are also possible. For example, instead of preparing a uniform dry mix it is possible to package the product by first depositing the required quantity of the candy particles in the bottom of the package and then filling the container with the regular dry cake mix. A further variation involves separate packaging of the candy and the cake mix and the combination of the two separate packages into a single package. The forms of the invention in which it is possible to segregate the candy particles and to place them in the bottom of the baking container directly without embodying them in the cake batter possess an added advantage. This permits a wider variation in the type of candy particle which may be used. Thus, if the candy particles are to be included in the batter, they should possess sufficient mechanical strength so that they are not broken up by either the hand mixing operation or the typical home food mixer operation involved in making cake batter. Where, however, the candy particles are not placed in the batter but are separately placed in the cake pan, this limitation on mechanical strength does not appear. The separate packaging of the candy product does require, however, that the candy product be free from objectionable tackiness.

Whatever the form of the invention the candy particles should have a density greater than the density of the batter during the baking operation. It is desired to point out that the density of the batter during baking may be considerably less than its density before baking due to the fact that during baking the leavening ingredients liberate carbon dioxide and thus reduce the density of the batter. The density differential will depend upon the particular form of the invention. Thus, if the candy particles are thoroughly distributed in the mix and thus become suspended in the batter, the density differential should be sufficient to actually cause the candy particles to settle through the batter to the bottom of the baking container. On the other hand, if the candy particles are first placed in the bottom of the baking container, the density differential need merely be enough to prevent the actual migration of the candy particles upward through the batter.

The candy particles must be sufficiently fusible under baking conditions to permit them to fuse at the bottom of the baking pan and thus distribute a fused candy composition across the bottom of the pan. In this connection it is not essential that the composition completely liquefy, but it should be sufficiently fusible to become plastic and to permit the attainment of a substantially continuous coating over the bottom of the pan. The candy may contain elements which are not fusible, to provide a non-uniform texture to the icing. Thus the candy component may be composed of a mixture of candy materials parts of which fuses at baking temperatures and part of which does not. The icing obtained from such a mixture is a fused candy coating containing components which have not been completely fused. It is usually desirable to include some fibrous or other non-fusible material to aid in the removal of the baked product from the pan and to facilitate cutting of the finished cake.

If the icing product is composed of a completely fusible material, there may be some tendency for a portion of it to adhere to the pan. However, if some fibrous materials or non-fusible material, such as coconut, wheat flakes, corn flakes, dried fruit, nuts and the like are included in the icing composition, there is less tendency for adherence to the bottom of the pan and also the resulting cake is easy to cut.

Finally, the candy composition should be composed of particles of suitable size such that their settling characteristics in the batter permit them to settle at least prior to the time that the cake composition develops a structure which would resist settling. The particular particle size can vary widely depending upon the density of the candy composition, the viscosity of the batter and other factors. The most desirable particle size for any particular candy composition and for any particular cake batter can readily be determined.

The cake batters contemplated by the present invention are preferably relatively thin, that is, of relatively low viscosity which will aid the candy composition to settle to the bottom in the early stages of the baking, such that it can fuse and form a separate and distinct layer rather than to be partially incorporated in the cake portion of the product.

It will be evident from the above description that numerous variations are possible in the specific compositions which are employed, all of which, however, embody the invention which in its broadest aspect contemplates the employment of icing components in a batter, the icing components having physical characteristics as described above.

ICING FORMULATIONS

Example 1

Ten pounds of sucrose, 6 pounds of corn syrup and 9 pounds of water were mixed and heated to produce a hard crack candy at about 300° F. Thereafter 3 pounds of shortening, 2 pounds of fines (which will be described later) and 1 ounce of lecithin were added to the above and the mixture was again reheated to approximately the hard crack temperature. Thereafter 3 pounds of coconut shreds were added and stirred into the mixture for several minutes. The material was then poured into pans and allowed to cool. The cooled product was then suitably ground to a desirable size; for example the product may be put through a Fitz mill and reduced to the extent that it will pass through a screen having square openings 3/8" on a side and be retained on a screen having square openings 0.0937" on a side. These screens are respectively the 3/8" standard sieve and the #8 standard sieve. The material which passes through the #8 standard sieve is the fines referred to above. This material may be returned to subsequent batches for reworking.

The following examples illustrate other formulations which may be prepared in essentially the manner described above for Example 1.

Example 2

| | | |
|---|---|---|
| Sucrose | lbs | 8 |
| Corn syrup | lbs | 7 |
| Water | lbs | 3 |
| Fines | lbs | 3 |
| Shortening | lbs | 2 |
| Lecithin | oz | ½ |
| Salt | oz | 1½ |
| Cocoa | lb | 1 |

Example 3

| | | |
|---|---|---|
| Sucrose | lbs | 8 |
| Corn syrup | lbs | 7 |
| Water | lbs | 3 |
| Shortening | lbs | 2 |
| Lecithin | oz | ¼ |
| Salt | oz | 1¼ |

In the above examples the ratio of sucrose to corn syrup tends to provide a hard, glossy and somewhat hygroscopic candy. By increasing the ratio of sucrose to corn syrup, the candy becomes less hygroscopic and takes on a greater degree of opaqueness which is carried over into the icing.

Example 4

| | | |
|---|---|---|
| Sucrose | lbs | 8 |
| Corn syrup | lbs | 7 |
| Water | lbs | 3 |
| Burnt sugar | lbs | ½ |
| Shortening | lbs | 2 |
| Lecithin | oz | ½ |
| Coconut | lbs | 1½ |
| Salt | oz | 1¼ |

CAKE MIX FORMULATIONS

Any cake mix formulations may be employed, but the following are given merely as illustrations.

Example 5

| | Pounds |
|---|---|
| Shortening | 9 |
| Sucrose | 45 |
| Flour | 38 |
| Milk solids | 5 |
| Salt and leavening | 2 |

These may be combined in the ordinary manner for the preparation of cake mixes as is well understood in the art.

Example 6

| | Pounds |
|---|---|
| Shortening | 13½ |
| Sucrose | 45 |
| Flour | 37 |
| Milk solids | 2 |
| Salt, leavening and flavor | 2½ |

The quantity of the icing component which is used relative to the cake mix component can be varied widely according to individual preference. Generally, it has been found that 7 ounces of the icing component combined with 13 ounces of the cake mix constitutes a desirable proportion for a great many uses.

In mixing a batter from the above weights of cake mix and icing component, ½ cup of water and one fresh egg (or its equivalent of dry egg solids and water) is added and mixed by hand until the batter is smooth. Then another ⅓ cup of water is added and the batter mixed until smooth and well blended. The mixed batter is then poured into a well greased baking tin of desired size and baked at 350–375° F. for 25–35 minutes. Upon removal from the oven the cake pan is immediately inverted onto a wire rack, plate or tin and allowed to drain for from 2–10 minutes, whereupon the inverted baking tin is removed to reveal a cake with an icing over the top.

The preferred candy particles are those which are fairly hard and relatively non-tacky. This simplifies both the preparation and packaging. The candy material when made is simply cooled to permit it to solidify after which it is ground in suitable mills to the desired particle size. The candy may also be cast in the usual manner into the desired size and shape. No difficulties of balling are encountered through the cohesion of the individual particles. It is of course possible to use softer icing components and these may be prepared, for example by chilling the candy material to a suitable low temperature at which it can be ground without difficulty from balling. This, however, does present less desirable manufacturing operations.

We claim as our invention:

1. A cake batter containing as a self-icing ingredient candy particles having a density greater than the density of the batter during baking and which are fusible at the temperature employed for baking the batter.

2. Product according to claim 1 in which the particles are predominantly of a size such that they would pass through a 3/8" standard sieve and be retained on a No. 8 standard sieve.

3. A cake batter containing as a self-icing ingredient candy particles of a hard crack type candy, the candy particle having a density greater than the density of the batter during baking and being fusible at baking temperatures to form a substantially continuous coating across the bottom of the container in which the batter is baked.

4. Product according to claim 1 in which the candy particles are non-homogeneous and contain non-fusible, non-sugar food materials.

5. Product according to claim 1 in which the candy particles contain shredded coconut.

6. A cake batter containing solid candy particles as an icing ingredient, the candy particles being disposed at the bottom of the cake batter and being fusible at the temperature employed for baking the batter.

7. Process of making a cake which comprises preparing a batter containing as a self-icing ingredient, candy particles having a density greater than the batter during baking and which are fusible under the conditions of baking and subjecting the batter to a baking operation in which the candy particles settle to the bottom of the baking container and fuse to form a substantially continuous and distinct coating over the bottom of the baking container.

8. Process of making a cake which comprises preparing a cake batter containing candy particles as an icing ingredient, the candy particles being disposed at the bottom of the cake batter and being fusible at the temperature employed for baking the batter, subjecting the batter to a baking operation to fuse the candy particles to form a substantially continuous and distinct coating over the bottom of the baking container.

9. A dry cake mix containing as a self-icing ingredient, candy particles having a density greater than the density during baking of the batter prepared from said mix, and which are fusible at the temperature employed for baking the batter.

10. A dry cake mix containing as a self-icing ingredient, candy particles of a hard crack type candy, the candy particle having a density greater than the density of the batter during baking and being fusible at baking temperatures to form a substantially continuous coating across the bottom of the container in which the batter is baked.

11. A dry cake mix containing as a self-icing ingredient, solid candy particles having a density greater than the density during baking of the batter prepared from said mix and which are fusible at the temperature employed for baking the batter, the candy particles being substantially uniformly distributed through the mix.

12. Product according to claim 11 in which the candy contains non-fusible, non-sugar material.

13. Product according to claim 11 in which the candy contains coconut.

References Cited in the file of this patent

"Everybody's Cookbook" by Lord, Harcourt, Brace and Company, New York, Revised Edition, Pages 133, 138, 152, 162, and 163.